INVENTOR.
WILLIAM H. KAUTZ
BY
Lindenberg + Freilich
ATTORNEYS

INVENTOR.
WILLIAM H. KAUTZ
BY Lindenberg + Freilich
ATTORNEYS

INVENTOR.
WILLIAM H. KAUTZ
BY Lindenberg & Freilich
ATTORNEYS

United States Patent Office 3,505,653
Patented Apr. 7, 1970

3,505,653
SORTING ARRAY

William H. Kautz, Woodside, Calif., assignor to Stanford Research Institute, Menlo Park, Calif., a corporation of California Filed Aug. 14, 1967, Ser. No. 660,343
Int. Cl. G06f 7/04
U.S. Cl. 340—172.5 12 Claims

ABSTRACT OF THE DISCLOSURE

A logic network for use in digital computers for sorting data words or numbers to arrange them according to their values, which uses an array of many identical cells in a two dimensional arrangement adapted for realization by integrated semiconductor technology.

BACKGROUND OF THE INVENTION

This invention relates to digital logic circuits which are especially useful in digital computers and other digital data handling apparatus.

Digital data processing equipment often requires sorting circuits for receiving a group of data words and arranging them in order of their values. For example, general purpose computers frequently require sorting circuits for arranging a number of commands in accordance with their priority, or arranging data words by size to improve the accuracy of a computation. Also, some data processing equipment requires circuits for arranging names alphabetically. Heretofore, such circuits have generally been realized by serial execution of very long programs on a simple circuit, or by high-speed networks of components connected in a complex manner. Inasmuch as the sorting circuits used have generally been of high capacity in order to store a large number of long data words, the complex high-speed designs have resulted in circuits which were expensive to design, fabricate and test. Sorting circuits utilizing simple and repetitive connections would enable a concentration of design efforts on the limited number of types of components and connections. If such circuits also were of a design which was conducive to economical manufacture, they would make the manufacture of many types of digital equipment substantially more economical.

SUMMARY OF THE INVENTION

This invention provides a circuit for receiving data words and arranging them in accordance with their values, by utilizing an array having a large number of identical cells connected to each other in an identical manner. The cells are arranged in a two dimensional structure which is well adapted for fabrication by integrated semiconductor technology. As a result of the fact that the cells are identical, it is economical to apply large efforts to the design of the individual cell and its connections, thereby enabling high efficiency and reliability and high packing densities.

The array of this invention comprises a large number of identical logic cells arranged in rows and columns. Each row of the array stores a data word, assumed to be encoded as a conventional binary number, the individual cells of the row holding the individual digits of the word. An external X register holds a new word which is to be compared with the words already in the array. Generally, the words already in the array are already sorted. When the comparison is made all words in the array which are smaller than the new word are moved down one row, while the new word is transferred from the X register to the resulting vacant row. Thus, the new word has been entered into the array in a position corresponding to its value with respect to the other words in the array.

The array is utilized by maintaining a sorted file of previously entered words, with the largest in the first row, and any empty rows (wherein all digits are 0) being the last rows. A new word is entered into the X register, each cell of which connects to the corresponding column of the array. A word select register, or W register, has one cell connected to each row of the array for monitoring that row. Each W cell generally receives a 0 or 1 from the row it monitors, and generally delivers a 0 or 1 back to the monitored row.

All rows at the top of the array which contain words larger than the new word in the X register, deliver a 0 to the W register cell which monitors that row. The first row of the array which contains a data word which is less than the new word in the X register delivers a 1 to the cell of the W register monitoring that row. All succeeding cells of the array also deliver 1's to their W cells. Thus, the W register indicates in which row the new word should be entered, that row being the first row whose W cell contains a 1.

When a clock pulse is delivered to all cells of the array, those rows whose W register cells contain a 1 transfer their data words to the next lower cell of the array. At the same time, the new word contained in the X register is entered into the first row which contains a 1 in its W register cell, while the data word of lowest value is expelled from the last row of the array. Such lowest value word can be delivered to another register or can be recirculated to the X register cell, from which it may be removed or otherwise utilized.

In order to conduct the comparison process wherein the data word in the X register is compared to the words in the various rows, and to transfer the words from a row to the next lower row, each cell is provided with several connections to neighboring cells. Each cell of the array has several inputs and outputs received from preceding cells of the same column and row and delivered to succeeding cells of the same column and row. A row bus connects the W register cell of each row with all cells of that row. In addition, each cell has one input from the two adjacent preceding cells, which are in the same column or in the same row, and provides one output to each of the adjacent succeeding cells of the same column and row. If the row-bus input (from the W cell) is 0, the state of the cell is not changed, and the column input from the preceding cell in the same column is passed through to the next cell of the same column. If the row-bus input (from the W cell) is 1, the existing state of the cell is transferred to the next succeeding cell in the same column, while the new state of the cell equals the state of the preceding cell of the same column. Each cell contains a memory element such as a flip-flop for establishing a state, and various gates for comparing its state with various inputs to provide the required outputs.

A more complete understanding of the invention can be had by considering the following detailed description and claims, taken in conjunction with the accompanying drawings.

DESCRIPTION OF THE PREFERRED EMBODIMENTS

Figure 1:
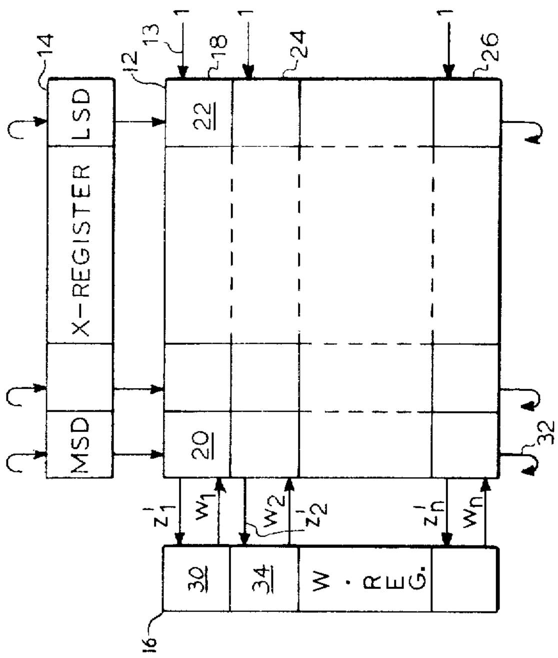
FIGURE 1 is a representation of a sorting array constructed in accordance with the present invention.

FIGURE 1 illustrates an embodiment of the invention comprising an array 12 of cells arranged in columns and rows and having numerous connection terminals along its edges, an X register 14 connected along one edge of the array 12, and a W register 16 connected along another edge of the array. Each row of the array, such as the first or top row 18, serves as a register means that stores a data word expressed as a digit-weighted binary number. Each cell of the row has one of two binary states representing one digit of the number. The most significant digit of the number is contained in the left-most cell 20, while the least significant digit is contained in the right-most cell 22 of the row.

The array 12 can be used to hold many data words, or numbers, one in each row. The largest number is normally located in the top row 18, the next largest number in the next row 24 and so forth until the last or bottom row 26 contains the lowest value number, which may be zero. A new number can be entered into the array at a row appropriate to its value so that all rows above it have a higher value and all rows below it have a lower value. The new word is first entered into the X register 14 with the most significant digit in the left-most cell and the least significant digit in the right-most cell of the register. As a result of the entry of the new word in the X register, each row of cells in the array 12 generates a $z'$ output, delivered to the W-register 16, which is 0 for every row containing a number whose value is greater than or equal to the new word, and which is 1 for every row containing a word whose value is less than the new word. The $z'$ output of each row is entered into a corresponding cell of the W-register 16.

The W-register 16 delivers an output $w$ to each row of cells, which is bussed to all cells of the row. In many applications, the $w$ output is equal to the $z'$ input for each of the W register cells. A clock input to the array 12 provides a pulse to every cell of the array. At the time the clock is delivered, each cell in those rows having a W bus input equal to 1, transfers its contents to the succeeding row, which is below it. This is accomplished by each cell of such rows delivering its binary output to the next succeeding cell in the same column. In the arrangement shown in FIGURE 1, the last row 26 delivers its contents back up into the X-register 14, from which it can be read out and another new word substituted in the X-register.

At the same time that all the rows that have a $w$ bus input equal to 1 transfer their contents to the next row, the new word in the X-register 14 is transferred down to the first row having a $w=1$ bus signal. Thus the new word has been entered into the array in a row which is below all rows having a number larger than or equal to the new word, and above all other rows. Additionally, the smallest word of the array has been read out of the last row of the array and entered into the X-register 14.

Figure 2:
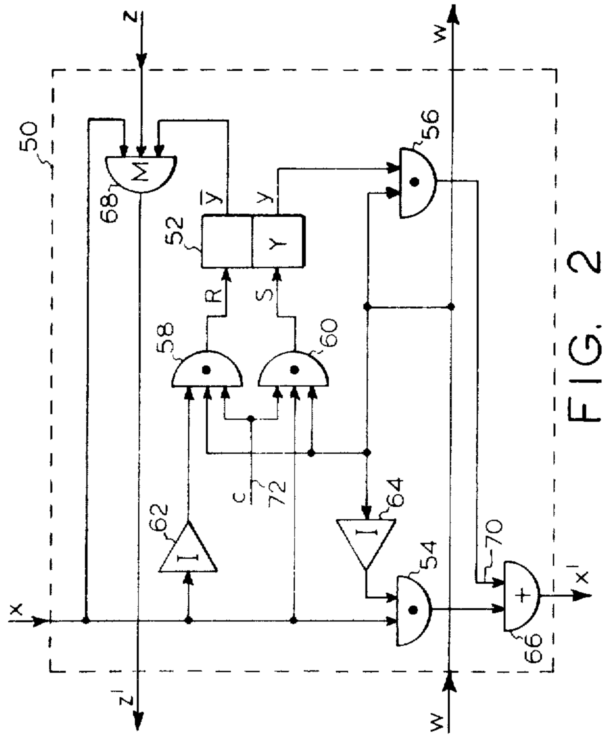
FIGURE 2 is a schematic diagram of one cell of the main array of FIGURE 1.

FIGURE 2 illustrates one cell 50 of the array 12, showing its circuitry which is identical to the circuitry of the other cells of the array. The cell comprises an RS flip-flop 52 which stores the state of the cell, thereby defining one binary digit. The flip-flops in an entire row define all of the digits in the word stored in that row. A pulse delivered to the R or S input causes the flip-flop to reset or set, respectively, thereby representing a "0" or "1" state, respectively. The flip-flop has $\bar{y}$ and $y$ outputs, sometimes referred to as the 0 and 1 outputs, respectively, or the false and true outputs, respectively. When the flip-flop is reset only the $\bar{y}$ output carries a "1" signal, and when the flip-flop is set only the $y$ output carries a "1" signal. The cell 50 also has four AND gates 54, 56, 58 and 60, two inverters 62 and 64, OR gate 66, and a MAJORITY gate 68.

The cell 50 has a column input $x$ and column output $x'$ connecting it to the immediately preceding and succeeding cells, respectively, of the same column. The cell 50 also has a $z$ input and $z'$ output connecting it to the immediately preceding and succeeding cells of the same row. A row bus $w$ passes through all cells of the row, and carries the same signal to each of them. In the case of the cells along the edges, the $x$ input of the cells in the topmost row are received from the cells of the X register, the $z$ inputs to the rightmost cells are 1's, and the $w$ bus inputs are received from the cells of the W register.

A first function of a row of cells is to compare the entire word received from the X register with the entire word contained in the cells of the row, and to deliver a $z'$ output from the leftmost cell of the row. The $z'$ output is 0 or 1 depending upon whether the number already stored in the row is greater than or is no greater than (equal to or less than), respectively, the new word from the X-register. The comparison process involves the MAJORITY gate 68 of each cell, which has as inputs the $x$ input and $z$ input from the preceding cells of the same column and row and the $\bar{y}$ output of the flip-flop 52. If a majority of the three inputs to the MAJORITY gate is 1, the gate delivers a 1 on its $z'$ output to the next cell of the row. However, if a majority of the three inputs to the MAJORITY gate is 0, the gate delivers a 0 on its $z'$ output to the next cell of the row.

Figure 3:
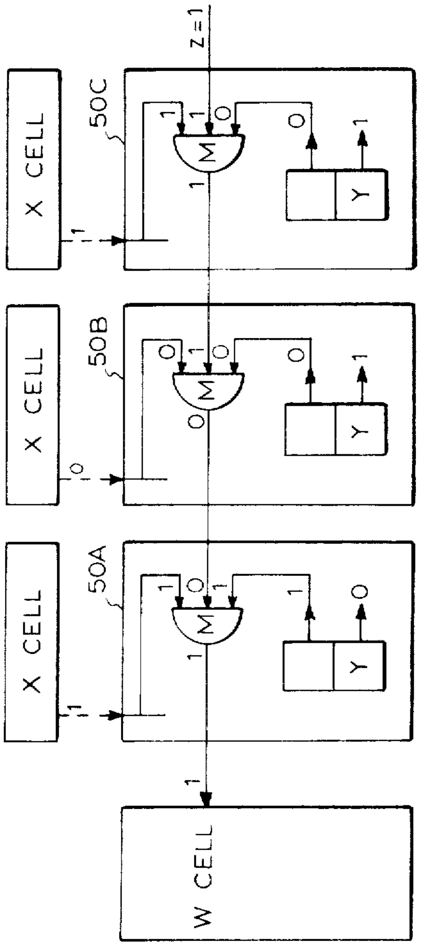
FIGURE 3 is a partial representation of a sorting array, showing various signal values therein for the comparison of an X register word with a word contained in a row of the array.

A better understanding of the array can be had by considering the processes involved in comparing a new word with a stored word, for example, a new word represented by the number 5 with a stored word represented by the number 3. This comparison is represented by the states of the partial circuit of FIGURE 3. The new word, which is "101" in binary form, is transmitted over the $x$ inputs, while the stored word "011" is represented by the states of the flip-flops of the three cells 50A, 50B and 50C of a row. The right-most cell 50C of the row, representing the least significant digit, has a MAJORITY gate with inputs of 1 from the $x$ input, 1 from the $z$ input to the array, and 0 from the $\bar{y}$ output of the flip-flop in cell 50C. Since a majority of these three signals is 1, the MAJORITY gate delivers a 1 on its $z'$ output. The next most significant cell 50B of the row has inputs to its MAJORITY gate, of 0 from the $x$ input, 1 from the $z$ input from the preceding cell 50C and 0 from the flip-flop of the cell, so it delivers a 0 on its $z'$ output. The third cell 50A of the row has a MAJORITY gate with inputs of $x=1$, $z=0$ and $\bar{y}=1$, so it delivers a 1 on its $z'$ output. Thus the $z'$ output of the most significant digit cell 50A delivers a 1 to the W register cell indicating that the word stored in the row is less than or equal to the new word from the X-register.

Reference is again made to the cell of FIGURE 2. Normally, the first step in generating $z'$ outputs from each row is carried out with the W register initially empty, so that the $w$ busses in all rows of the array carry the value 0. In this case, the $x'$ output of each cell carries the same value as the $x$ input to the cell, that is $x'=x$, and the $x$ input to each column is effectively bussed down to all cells of the column. This results from the fact that the $w$ input to each cell enters the Inverter 64; if $w=0$, the Inverter 64 delivers a 1 to AND gate 54. This causes AND gate 54 to deliver a 1 or 0 depending upon whether the $x$ input to the cell is 1 or 0, respectively. The 1 or 0 passes through the OR gate 66 to the $x'$ output. The other input 70 to the OR gate 66 is always 0 when $w=0$ because the input 70 is received from AND gate 56 which has one input equal to $w$. Thus, for $w=0$, $x=x'$.

With the $x$ inputs bussed down to all cells in each column, the number in the X-register can be compared to the number in each row of the array. This comparison which utilizes the MAJORITY gate of each cell, has been described in connection with the example in FIGURE 3. After the initial comparison, resulting in a $z'$ output from each row delivered to that W register cell monitoring the row, a clock is delivered to the W register. This clock causes every cell in the W register to acquire the state represented by the corresponding $z'$ input. Thereafter, the array 12 is ready to receive a clock input to each of its cells. As will be described, this clock input causes all rows having a $w=1$ bus input to transfer their contents to the next row, with the X-register word being transferred to the first row that has a $w=1$ bus input. For all rows having a $w=0$ bus input, the state of the cells in the rows remains undisturbed.

To transfer the contents of each row wherein $w=1$ to the next $w=1$ row, a clock is applied to the $c$ input 72 of each cell 50. The clock input 72 is delivered to two AND gates 58 and 60 of each cell. The AND gates 58 and 60 have second inputs equal to the $w$ bus signal. One of the AND gates 58 has a third input received from Inverter gate 62 and equal to $\bar{x}$, and the other AND gate 60 has a third input equal to $x$. When a pulse is delivered over clock input 72, one of the AND gates delivers a signal (assuming $w=1$), gate 58 delivering an output if $x=0$ and gate 60 delivering an output if $x=1$. As a result, if $x=0$ the flip-flop 52 is reset, and if $x=1$ flip-flop 52 is set, thereby establishing a new state of the cell 50 equal to the $x$ input thereto. In this way the signal received from the $x'$ output of the preceding cell (which equals the state of the next preceding cell in the same column if $w=1$ for that row, and equals the state of the X-register cell in the same column if no preceding row has a $w=0$) is entered into the flip-flop 52 of the cell 50 (still assuming $w=1$ for the row containing cell 50).

If $w=1$ for the cell 50 then the state of the flip-flop 52 (prior to change) is delivered to the $x'$ output of the cell. This occurs because the $w=1$ input is delivered to AND gate 56 so that the state of the flip-flop 52 passes through AND gate 56 into OR gate 66. Thus, if flip-flop 52 is set, so that the $y$ output equals 1, a 1 is delivered through AND gate 56 into OR gate 66 and thence to the $x'$ output. No input to OR gate 66 is received from AND gate 54 because the $w=1$ input causes Inverter gate 64 to deliver a 0 to AND gate 54 and therefore prevents a 1 output therefrom. Accordingly, the combination of the AND gates 54 and 56, the Inverter gate 64, and the OR gate 66 acts as a selecting means responsive to signals on the $w$ input for selectively connecting the signal on the $x$, or number input, and the digit stored in the memory flip-flop, to the $x'$, or number output, of the cell.

Each individual cell 50 can be described by logic equations relating its inputs to its outputs. The equations defining the operations of the cell 50 are:

$$x'=\bar{w}x+wy$$
$$y^*=wcx+(\overline{wc})\cdot y$$
$$z'=M(x,\bar{y},z)=x\bar{y}+z(x+\bar{y})$$

where $x$, $x'$, $z$, $z'$, and $w$ are the column and row inputs and outputs to each individual cell, $y$ is the present flip-flop state, $y^*$ is the succeeding flip-flop state, $c$ is the clock pulse to the cell, and M is the majority function, as described above.

The $x'$ outputs of the last row 26 of the array will generally represent the lowest number stored in the array (which number will be all zeros if the row 26 contains no data word), and if not discarded, such lowest number may be delivered to additional processing apparatus directly, or may first be entered into the X-register 14 for temporary storage.

The foregoing description illustrates one use of the array 12, which is for entering a new word into an array which already contains sorted words, and to enter it in a row appropriate to its size when compared to all other words in the array. The arrangement shown also may be used in a number of other ways, such as to enable the read out of a largest or second largest, or any other data word in a file.

If it is desired to read out the words in the file, starting with the largest, this can be done by placing a single one in the top cell 30 of the W register, which monitors the top row of the array, so only the row 18 has a $w=1$ bus input. Then the clock pulse is applied to the clock inputs 72 of all cells of the array. This causes each digit contained in the top row 18 to be transferred into the X-register 14 from which it can be read out. Thus, the largest word stored in the array can be readily obtained.

To read out the next largest word, a 1 is applied to the W register cell 34 which is second from the top, in order to read out the second row into the X-register, in the same manner. If it is desired to read out the data words starting with the smallest, this can be accomplished by entering a 1 in the bottom W register cell, and after each readout, shifting the $w=1$ state to the next higher cell and repeating the process. This procedure will produce an initial string of all 0 data words if the array is not full, and results in a gradual emptying of the file.

If it is desired to read out any row without emptying the file of that row, this is accomplished by entering a 1 in the W register cell at that row so that the $w$ bus of the row contains a 1, and not applying a clock pulse to the clock input 72 of each cell. The contents of the row are then read out from the bottom row output 32, or, since this output is connected to the X-register, it can be read into the X-register 14.

Other schemes for readout may be employed. For example, readout of the register starting with the smallest word can be accomplished by repeatedly entering into the array from the X-register the largest possible number (i.e., the number in which all binary digits are 1), thereby forcing the contents of the array out of the bottom, one word at a time. This method largely bypasses the need for the W register (the W register could even be eliminated here by connecting the $z'$ output of each row to the $w$ input to the row), but leaves the array full of 1's, which must then be cleared by some external means.

In most computation and data processing applications, words are sorted on the basis of not their relative magnitudes, but their magnitudes taken over only a subset of the digits (called the key) of the words. For example, a number representing a person and his address may have a first portion representing the person's name, and the last portion representing his address, including his ZIP Code number. In some applications, it may be desirable to sort the names according to only the ZIP Code number of the person. In this example, the ZIP Code would be the key of the data word, the rest of the name and address being called the "tag" portion. The array shown in FIGURE 1 may be expanded to sort words according to the digits in particular portions of the word by including a mask register to provide an array assembly as shown in FIGURE 4.

Figures 4, 5:
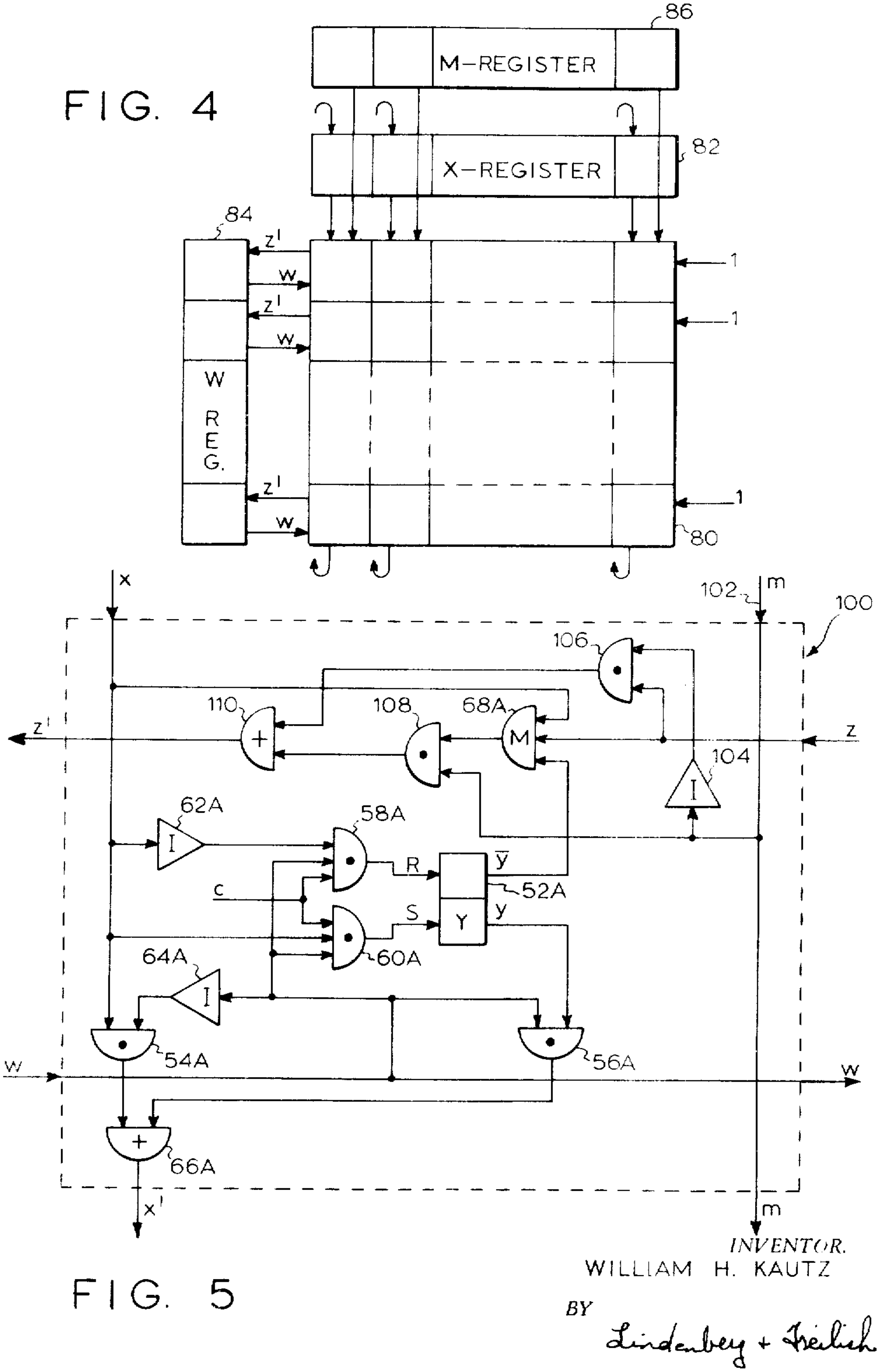
FIGURE 4 is a representation of another embodiment of a sorting array constructed in accordance with the present invention.
FIGURE 5 is a schematic diagram of one cell of the main array of FIGURE 4.

The arrangement of FIGURE 4 comprises an array 80 of cells, an X-register 82 for holding a new word to be entered into the array, a word-select or W register 84 for delivering $w$ outputs to determine which rows are to receive a new word, and a mask or M register 86 for determining which digits of every word in the array are to be ignored for sorting purposes. Each cell of the M register 86 delivers a 0 or 1 over column busses that connect that cell to every cell of the array 80 in the same column. Each cell of the array is largely similar to the cell shown in FIGURE 2; however, each cell contains additional circuitry which serves as inhibiting means for inhibiting, for sorting purposes, comparisons over the digit it contains. When the output $m$ of an M register cell is 1, every cell in the same column as that M cell behaves normally; that is, each of those array cells in that column utilizes the digit it contains for sorting purposes, as described for the array of FIGURE 1. However, for each M register cell in which $m=0$, all of the cells of the array in that column are inhibited so that the digits they contain do not affect the comparison of the data word in their row with the new word in the X-register.

FIGURE 5 shows one cell 100 of the array of FIGURE 4, the cell being of a construction similar to that of FIGURE 2 except that it contains additional elements for masking comparisons in the cell. The cell 100 includes a masking or $m$ column bus 102 which connects to all cells of the same column, and which has an input from an M register cell. The cell 100 also contains an Inverter gate 104, two AND gates 106 and 108 and an OR gate 110 in addition to all of the other gates present in the cell of FIGURE 2. The other components, 52A through 66A, designated in the cell 100 of FIGURE 5 are the same as those shown in FIGURE 2 and operate similarly. Accordingly, such components are designated by the same reference numbers, but with an A suffix.

If, in the cell 100 of FIGURE 5, the input $m$ on mask column bus 102 equals 1 the cell is not masked and performs in the same manner as the cell 50 of FIGURE 2. A 1 on $m$ line 102 passes to AND gate 108, thereby allowing the output of MAJORITY gate 68A to pass through. The output of MAJORITY gate 68A which passes through AND gate 108 then passes through OR gate 110 to the $z'$ output of the cell. The other input of OR gate 110 is a 0 signal, since it is received from AND gate 106; AND gate 106 has a 0 output because it receives a 0 input from inverter 104 whose input is $m=1$.

If $m=0$ then the cell 100 should make no contribution to the comparison during sorting. When $m=0$ the AND gate 108 is turned off and the $z$ input to the cell should equal the $z'$ output. The $m=0$ input passes through Inverter gate 104 to turn on AND gate 106. The AND gate 106 then passes the $z$ input to the cell to the OR gate 110, which passes it out at the $z'$ output of the cell. In this way, the final $z'$ output of the row of cells (which may be entered into the W register to determine whether that row will receive a $w=1$ row bus to change the word in the row) is not affected by the state of the cell 100 which has an $m=0$ column input.

The operation of the array of FIGURE 4 following the comparisons is identical to that described previously for the array of FIGURE 1. The digits stored in each cell of a row whose $w$ bus input is 1, are transferred down, independently of the $m$ input to the cells.

The relationship between the inputs and outputs and state of the cell 100 of FIGURE 5 can be expressed by the following equations:

$$x'=\overline{w}x+wy$$
$$y^*=wcx+(\overline{wc}\cdot y$$
$$z'=\overline{m}z+mM(x, \overline{y}, z)$$

where $x$, $x'$, $z$, and $z'$ represent the column and row inputs and outputs, $w$ represents the row bus having an input connected to all cells of a row and $m$ represents the column input bussed to all cells of a column, as described above. $y$ represents the state of the flip-flop memory prior to clock times and $y^*$ is that state of the flip-flop, after clock time for $w$, $c$, $x$, and $y$ values existing at clock time.

Figure 6:
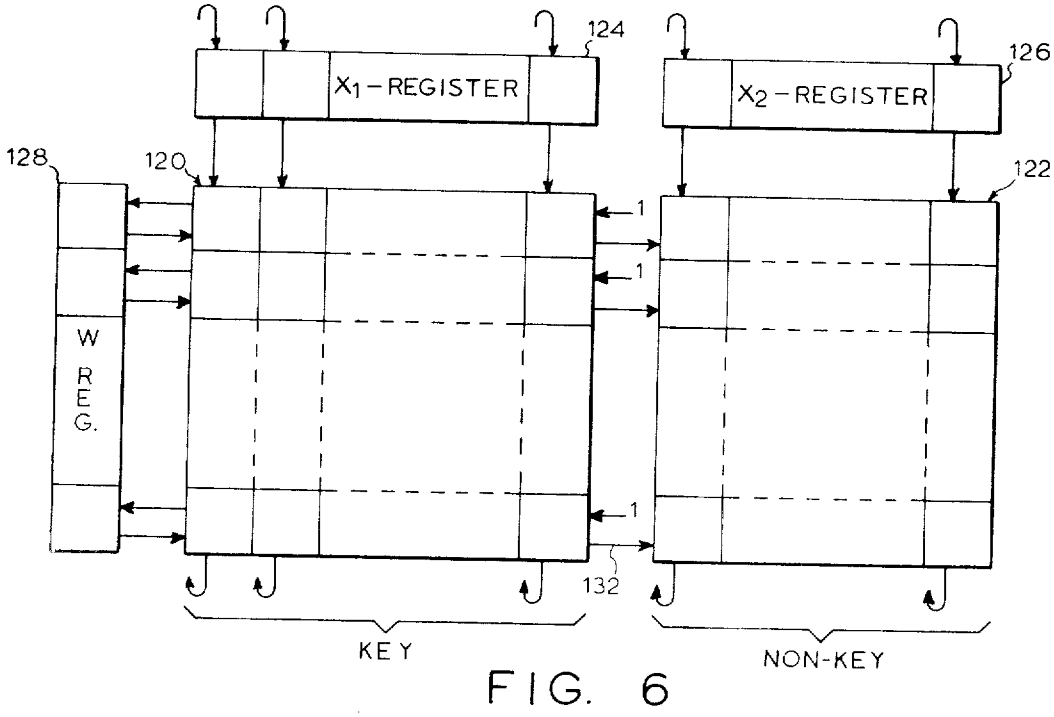
FIGURE 6 is a representation of another embodiment of a sorting array constructed in accordance with the invention.

The masking of particular digits of a data word also can be accomplished with the arrangement of FIGURE 6, which is simpler but less flexible than that of FIGURE 4. In the circuit of FIGURE 6, the key (that portion determining the sorter position of the complete data word) and non-key portions of the words are handled in two separate arrays: a key array 120 and a non-key or tag array 122. A complete data word is entered into two corresponding rows of the arrays, the key portion which determines sorting being entered into the key array 120 and the non-key or tag portion being entered into the tag array 122. (It may be noted that the tag portion of the word need not be represented in a binary code that is digit-weighted.) Similarly, an $X_1$ register 124 and an $X_2$ register 126 hold a complete new data word to be entered into the arrays, the $X_1$ register holding the key portion and the $X_2$ register holding the tag portion. A word select register, or W register 128 has outputs from each of its cells connected to one row of the key array 120. However, the row bus carrying the $w$ output extends to the tag array 122 by reason of $w$ or row bus connections 132 connecting the right-most cell of the key array to the left-most cell of the tag array for each row.

In the arrangement of FIGURE 5, data words are stored in the two arrays 120 and 122 with the key portion in the key array 120. The cells of the key array have circuits as shown in FIGURE 2. A new word is entered into the $X_1$ and $X_2$ registers and a comparison is automatically made between the value of the word portion in the $X_1$ register and the value of the word portions in each of the rows of the key array 120. The comparison results in a $z'$ output of the left-most cell of each row of the key array, which is delivered to the W register; a $z'=1$ denotes that the portion of the data word stored in the key array is less than or equal to the portion of the new word stored in the $X_1$ register. At a clock time when a clock is delivered to all cells of both arrays 120 and 122, the complete data words in all rows wherein $w=1$ are transferred down to the next row wherein $w=1$. The new word is transferred from the $X_1$ and $X_2$ registers into the first row wherein $w=1$, and the data word in the last row wherein $w=1$ is transferred up to the $X_1$ and $X_2$ registers. The data portions in the two arrays move together into corresponding rows of the arrays.

Figure 7:
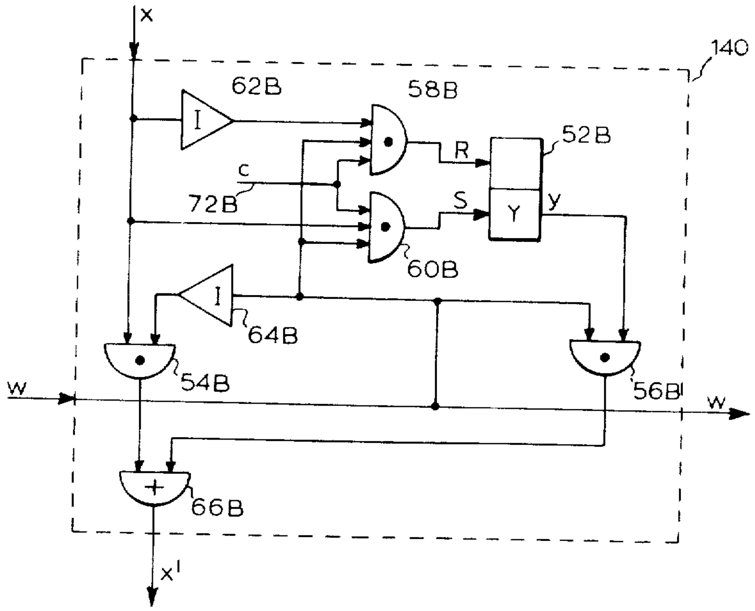
FIGURE 7 is a schematic diagram of a cell in the Non-Key portion of the array of FIGURE 6.

While each cell of the key array 120 has the circuit shown in FIGURE 2, each cell of the tag array 122 is of a simple form, inasmuch as it has no $z$ input or $z'$ output. FIGURE 7 is a diagram of each cell of the tag array 122 of FIGURE 6. This cell circuitry is the same as that shown in FIGURE 2 except that the gates associated with the $z'$ output are not included, since no comparisons have to be made. The tag cell 140 has an $x$ input and $x'$ output connecting it with the preceding and succeeding cells of the same column, and a $w$ row bus passing through the cell and other cells of the same row. One function of the cells is to transfer its state, which is defined by the state of the flip-flop 52B therein, to the $x'$ output. Another function is to acquire a new state equal to the $x$ input. Both of these functions are performed at a clock time when an input is delivered over clock input 72B, but if and only if a $w=1$ is carried on the $w$ bus. If $w=0$ the $x$ input equals the $x'$ output.

If the $w$ input to tag cell 140 equals 1, Inverter gate 64B delivers a 0 to AND gate 54B to inhibit it and prevent the $x$ input from passing through. The $w=1$ input enters AND gate 56B so that the state of the flip-flop 52B, which is equal to the output on its $y$ output, passes through the AND gate 56B, or gate 66B and into the $x'$ output. At clock time, when a clock is delivered to clock line 72B, AND gates 58B and 60B have two inputs which are 1's (the other being the $w$ input). If $x=0$, then a 1 is delivered by Inverter gate 62B through AND gate 58B to reset the flip-flop 52B and therefore set it in a 0 state. If $x=1$ at the clock time, then the $x=1$ passes through AND gate 60B to set flip-flop 52B and therefore place it in a 1 state. Accordingly, a $w=1$ results in the cell achieving a state equal to the $x$ input.

If $w=0$ at clock time, then Inverter gate 64B delivers a 1 to AND gate 54B so that the $x$ input to the cell passes through OR gate 66B to the $x'$ output. The $w=0$ condition results in there being a 0 input to one input port of AND gate 56B, so the state of the flip-flop 52B does not pass therethrough and does not affect the $x'$ output of the cell.

In those applications where a mask register is used, providing an arrangement of the type shown in FIGURE 4, it is sometimes desirable to allow for a change in sorting based on the use of a different portion of the data word, i.e., a different group of digits is used as the key. This may sometimes be desirable for an already-ordered file in order to resort it on the basis of a new key. One of the simplest ways to achieve such resorting is to always reserve the left-most digit position within each word to indicate "resort" status, and this digit will normally have the value 0. When the key is changed, a 1 is inserted into the most significant digit position in the X-register, that is, the left-most X-register cell, at each cycle. The array is cycled a number $N+1$ of times (for an array with N rows) by delivering $N+1$ clocks to the clock $c$ input of the cells. This results in the array pushing one data word out of the bottom row at a time, and reinserting it into the X-register, where a 1 is added at the most significant digit position. The words with the added ones are thereby successively resorted into the array. The extra 1 causes each word that is being refiled to be treated as if it were larger than all of the original words in the file, thereby keeping the new file "on top" of the old one. Keeping the new file on top of the old one assures that all of the old file words will be ejected from the bottom for resorting. The operation may be easily stopped after resorting occurs by stopping the delivery of clock pulses when the first word with the extra 1 again appears in the X-register.

After one change of key in the mask register arrangement, the resorting with still another key can be accomplished by first circulating the words for another $N+1$ cycles (for an array with N rows) while holding all W register cells in a 1 state. In addition, the left-most digit of the X-register is maintained at 0 in order to clear out the left-most column to prepare for a recycling-resorting. Other processes can also be used, such as augmenting the array with a reset line attached to all flip-flops in the left-most column (most significant digit) in order to clear this column before repeating the resort operation. Another alternative is to reserve a second most significant digit position to indicate the next "resort" status.

If two or more words of equal magnitude are filed in the arrays described hereinabove, they will occupy adjacent rows, with the more recent entries located above the earlier entries. If the opposite ordering of equal-sized words is desired for readout, so that the more recent entries are located in a lower position than existing entries, this may be achieved by changing all of the boundary inputs on the right-hand edge of the array from 1 to 0. Such right-hand edge inputs are designated by the numeral 13 in FIGURE 1. This modification causes comparisons to be executed according to a strict inequality so that a new word of equal size is treated as if it were smaller than the stored word, instead of a simple inequality wherein a new word of equal size is treated as if it were larger than the stored word.

It may be noted that the array can store information represented as numbers, and that the numbers may be represented in a variety of forms. For example, the arrays are adapted to handle floating-point numbers, i.e., in logarithm form, provided that the exponent, or characteristic, is placed to the left of the mantissa.

While arrangements have been shown including X and W registers, in some situations one or both registers can be dispensed with. It should be understood that the X-register is used only as a buffer, and if the signals and timing on the $x$ and $x'$ lines are compatible with those of the input and output channels connected to the rest of the digital system, then the X-register can be eliminated. Even when resorting, the $x'$ lines of the bottom row can be fed back directly to the $x$ inputs of the top row. The W register may be eliminated by tying each $z'$ output of the left-most cell of each row directly to the $w$ bus of the same row.

In many computing systems, the array of the invention is generally used as a single address memory with a write-in capacity of N words, equal to the number of rows, and having the property that a readout command ($w=1$) applied to the $w$ cell of the top-most row (while all other $w$ cells have a 0) will always produce the largest word in the memory. If a mask register is used, it should be addressable. In some situations it is also desirable to make the W register addressable, so that prescribed blocks of words or individuals words can be selected or inhibited during the sorting and read-out operations. Even a small degree of external control of the W register allows the use of relatively sophisticated selection criteria; for example, selection can be made of all words whose magnitudes fall between given limits, the selection of the second largest or $k$th largest word, the selection on the basis of multiple keys, and selection using combined inequality and equality testing.

Arrays may be readily constructed similar to those described hereinabove, but in which the rows of the smallest and largest words are interchanged, so that the smallest word is in the top row, and the largest in the bottom row. This may be accomplished by modifying the equation for $z'$ outputs to the form:

$$z'=\bar{x}y+z(\bar{x}+y)$$

where $x$ is the column input, $z$ and $z'$ are the row input and output and $y$ is the state of the cell, all as described above for these cells. The cell complexity required for such a modification is substantially the same as for the previously described cells.

The arrays described hereinabove are particularly well-adapted to realization by large-chip integrated circuit techniques, for a number of reasons; first, the array has a small number of external leads in comparison with the amount of storage and logic capability within the array. Second, iterative (repetitive) layout greatly facilitates fabrication and testing and enables the design effort to be concentrated on one cell type. Third, most of the internal gating enjoys the advantage of small fan-in and fan-out (i.e., few inputs and outputs from each gate) and short wire lengths, so that the high packing density and the ultra-high-speed capabilities of integrated circuitry may be realized. This latter advantage is particularly important with respect to the long cascades of majority cells, which are inherently necessary in almost any type of sorting array, and the vertical cascades of gates along the $x$ lines, which cannot be avoided in almost any array capable of selective word transfer.

The arrays described herein are useful not only for sorting a number of data words, but also in other digital applications such as the dynamic realization of arbitrary switching functions, and the realization of push down stacks and buffer memories. Furthermore, the arrays may be utilized in many design forms and with many types of external equipment. While particular embodiments of the invention have been illustrated and described, it should be understood that many modifications and variations may be resorted by those skilled in the art, and the scope of the invention is limited only by a just interpretation of the following claims.

What is claimed is:

1. A sorting array for sorting a plurality of numbers comprising:

a plurality of ordered row means, each of said row means including a plurality of individual cells, each cell representing one digit of predetermined relative significance;

each of said cells including a memory for storing a digit value, a word select input, a number input, a number output, and selecting means responsive to signals received on said word select input for selectively connecting said number input to said memory or to said number output; and a plurality of connecting means, each associated with two rows means, for connecting the number output of each cells of a first of said row means to the number input of a cell of the second row means which is of the same relative significance.

2. A sorting array as defined in claim 1 including:

word select register means including a portion associated with one of said row means and responsive to at least a portion of the number stored by said memories of the cells of said row means and to at least a corresponding portion of a number represented by signals on said number inputs of said cells, said word select register means having an output connected to said word select inputs of said cells for delivering signals thereto in accordance with the relative values of said number portions represented in said memories of said cells and on said number inputs of said cells.

3. A sorting array as defined in claim 2 including:

masking means for selectively altering the number portion on said cell memories and on said number inputs to which said portion of said word select register means is responsive.

4. A sorting array as defined in claim 1 wherein:

each of said memories comprises a bistable means representing a binary digit;

each of said row means includes a bus connected to the word select input of each of the cells in a row means; and each of said selecting means comprises logic means including gating means for selectively passing a binary digit represented in said bistable means and a binary digit represented on said number input in accordance with a binary signal on said bus.

5. A sorting array comprising:

a multiplicity of bistable cells operationally arranged in rows and columns;

a plurality of row bus means, each connecting together all cells of an operational row, for carrying a signal to each cell of said row;

a multiplicity of column input terminals, each coupled to one of said cells;

a multiplicity of column output terminals, each coupled to one of said cells; and means connecting the column output terminal coupled to each of said cells to the column input terminal coupled to an operationally adjacent cell in the same operational column;

each of said cells having state defining means defining a bistable state of said cell, and logic means for providing a signal to the column output coupled to said cell which is determined by a signal on the column input coupled to said cell when a first signal is received on said row means and which is determined by the state of said cell independently of the column input to said cell when a second signal is received on said row bus means; and a plurality of said cells has a row input, a row output, majority gate means having a first majority gate input connected to the column input terminal which is coupled to said cell, a second majority gate input connected to said state defining means, a third majority gate input connected to the row input to said cell, and a majority gate output connected to the row output of said cell.

6. A sorting array as defined in claim 5 wherein:

said array includes a plurality of mask column busses, each connected to all cells of a column for carrying signals thereto; and a plurality of said cells of said array located in columns containing said mask column busses, include inhibiting means connected to said mask column bus and said row input and row output, for delivering a signal to said row output equal to a signal on the row input independent of the state of the cell and independent of the signal on the column input terminal coupled to the cell when a first signal is received on said mask column bus, and for delivering a signal to said row output of said cell dependent upon the signal to the row input and the signal on the column input terminal and the state of the cell when a second signal is received on said mask column bus connected thereto.

7. A sorting array as defined in claim 6 including:

a masking register having a plurality of masking cells, each associated with one column of cells of said array and having an output connected to said mask column bus of said row, for selectively activating and deactivating said inhibiting means of the cells of said array located in the column associated with said masking cell.

8. A sorting array as defined in claim 5 including:

a word select register means having register cells associated with individual rows of cells of said array, each register cell having an input connected to the row output of a predetermined cell of said row and having an output connected to the row bus of that row, for enabling the delivery of a row bus signal to said row which is dependent upon the row output from said predetermined cell of said row.

9. A sorting array comprising:

a multiplicity of bistable cells operationally arranged in rows and columns;

a plurality of rows bus means, each connecting together all cells of an operational row, for carrying a signal to each cell of said row;

a multiplicity of column input terminals, each coupled to one of said cells;

a multiplicity of column output terminals, each coupled to one of said cells;

each of said cells having flip-flop means with set and reset states, a first AND gate having a first input connected to said row bus means and a second input connected to an output of said flip-flop, an OR gate having an input connected to the output of said first AND gate and an output connected to said column output of said cell, and a second AND gate having a first input connected to the complement of the input from said row bus means and a second input connected to the column input terminal to said cell and an output connected to an input of said OR gate; and means connecting the column output terminal coupled to each of said cells to the column input terminal coupled to an operationally adjacent cell in the same operational column.

10. A sorting array as defined in claim 9 including:

gate means in each of said cells having at least one output connected to said flip-flop means and having inputs connected to said column input terminal to said cell and to said row bus means, for selectively establishing a new state of said flip-flop means in accordance with signals on said column input terminal coupled to said cell and signals on said row bus means.

11. A sorting array comprising:

a pluarlity of ordered register means, each having a memory for holding a number, an input for receiving a number, and an output for delivering a number;

means for coupling the output of each of a plurality of said register means to the input of the next successive register means;

means in each of said register means for comparing a number at its input with the number held in its memory; and means in each register means responsive to said means for comparing, for selectively entering the number received on its input into its memory and coupling the number in its memory to its output if the number on its input is greater than the number in its memory, or coupling the number on its input to its output if the number on its input is less than the number in its memory, whereby to cause successively lower numbers to drift down to successively lower-ordered register means.

12. The sorting array described in claim 11 including:

a word register coupled to said register means for commanding a selected register means to enter the number on its input into its memory, regardless of the value relationship of the number on its input and in its memory.

References Cited

UNITED STATES PATENTS

| | | | |
|---|---|---|---|
| 3,348,214 | 10/1967 | Barbetta | 340—172.5 |
| 3,292,159 | 12/1966 | Koerner | 340—172.5 |
| 3,241,123 | 3/1966 | Boucheron | 340—172.5 |

GARETH D. SHAW, Primary Examiner